United States Patent Office 3,223,821
Patented Dec. 14, 1965

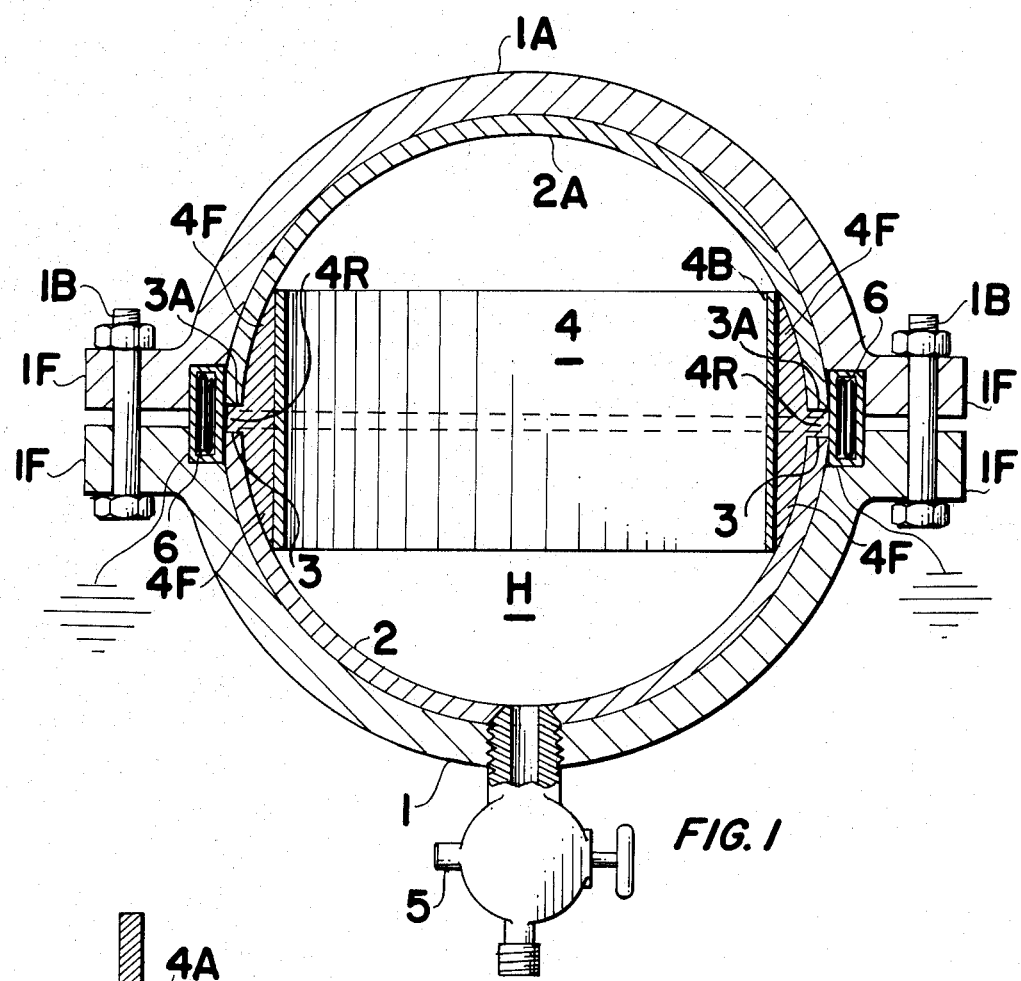

3,223,821
TANK WELDING PROCESS
Jesse D. Langdon, 1 John St., East Rockaway 5, N.Y.
Filed Jan. 27, 1964, Ser. No. 340,276
4 Claims. (Cl. 219—106)

This invention pertains to processing methods for manufacture of tanks for containment of fluid pressure and includes a new use of known process, machine, manufacture, composition of matter, or material used in a new and novel way, as follows:

(1) Utilization of jig or die means to hold preformed sectional tank portions in assembled relationship with their edges in convergent opposition concomitant preformed welding strip means provided with ridge means inserted between the edges for welding in a homogeneous whole.

(2) Placement of preformed welding strip means provided with median ridge means for insertion between opposed edges of the sectional tank portions, at least the ridge means of the strip means being made of material fusible for bonding and homogeneous mergement concomitant convergently disposed edges of and impinged between the preformed tank portions or sections suitably held in assembled position by conforming jig or die means encompassing component parts of the tank; the strip means being provided with surface flange means bordering the ridge means and straddling inside of seam means formed between opposed edges of sectional tank portions, and the median ridge.

(3) Provision of means for introducing pneumatic pressure into the hollow of a tank effective against inside face base means provided for welding strip means to urge flange means provided by the base means and bordering the ridge means, radially outward against proximate inner wall faces of sectional tank portions adjacent edges thereof abutting opposite sides of the ridge means.

(4) Provision of means to prevent flow of molten material from between proximate walls and edges of the sectional tank portions and flange means supporting the strip during welding process when heat is applied.

(5) Provision of heating means applied externally of adjoining edges of sectional tank portions and ridge means formed concomitant strip means disposed between abutting edges of sectional tank portions when held in place by jig or die means supplemented by internal pneumatic pressure means injected into the hollow of assembled sectional portions of the tank at a predetermined temperature, whereby internal temperature of welding strip means is suitably affected for bonding edge portions of respective sectional tank portions in a homogeneous whole.

Other coactive means and steps involved in the process and method comprising the invention will appear in specification and claims, do not depart from essence of the invention as illustrated by the drawing showing best use and reduction to practice of the process comprising the invention or discovery as at present advised, which may be changed within scope of claims.

Of the drawing:

FIG. 1 is a schematic diagram representing in median sectional elevation, a globular tank with components thereof contained in assembled relationship by jig or die means 1–1A–1B, including welding strip means 4 concomitant sectional portions 2–2A with pneumatic pressure control valve 5 shown in external elevation, communicating with hollow H thru jig or die portion 1 and sectional tank portion 2.

FIG. 2 is a transverse sectional elevation of alternative form of welding strip 4A.

FIG. 1 illustrates imperforate die form of jig means having lower section 1 and upper section 1A provided with flanges 1F—1F held together by bolt means 1B—1B. Concave tank portions or sections 2–2A are shown in assembled position clamped within jig means 1–1A. Welding strip 4 is provided with integral longitudinal ridge means 4R inserted between upper edge 3 of lower sectional tank portion 2 and lower edge of upper sectional tank portion 2A. Ridge 4R of strip 4 is impinged between edges 3 and 3A. Transverse section of strip 4 shows base 4B, having one face exposed toward hollow H of sectional tank portions 2–2A, continuous median ridge 4R projecting from that side of strip means 4 that is opposite inner face of base 4B, flange means 4F—4F bordering ridge 4R and resting against proximate inside surfaces of sectional tank portion 2–2A adjoining edges 3–3A.

Lower section 1 of jig means is provided with pneumatic pressure control valve means 5 threadedly inserted therethru and formed with conically tapered terminal end projecting forwardly of lower jig concavity and matching a hole provided thru the wall of sectional tank portion 1 to permit entry or exhaust of pneumatic pressure into or from hollow H. Tapered inner end of valve 5 provides snug pressure tight fit concomitant jig section 1 and sectional tank portion 2 when pneumatic pressure is injected into hollow H for expanding sectional portions 2–2A against jig means 1–1A. An electric heating element 6 is embedded into and rests in a recess surrounding upper inner edge of lower half of sectional tank portion 1 of jig means and extends into a recess surrounding inner lower edge of upper half of sectional tank portion 1A, in this instance, electrical heating element 6 is formed with an outer wall of material incapable of fusing at temperature sufficient to fuse material of welding strip ridge 4B and proximate edges 3–3A of sectional portion 2–2A together when subjected to welding temperature.

FIG. 1 shows welding strip 4 in transverse section considered best form for use in bonding edges 3 and 3A and adjoining proximate surfaces of tank sections 2–2A together with strip portions 4F—4F and ridge means 4R of strip 4 to form a homogeneous tank unit: Where aluminum is used for the tank, inner face 4B of strip 4 is preferably made of relatively thin stainless steel with opposite edges arranged to directly contact proximate inner surfaces of sectional tank portions 2–2A. Flange faces 4F—4F of strip 4 facing toward proximate inside faces of sectional tank portions 2–2A bordering and including ridge 4A made of or faced with aluminum which may be coated with suitable fluxing material indigeneous to material of sectional tank portions if desired.

FIG. 2 shows cross section of performed metal or plastic strip 4 which may be made of material fusing at same or lower temperature than that of sectional tank portions 2 and 2A. Base means 4C of strip 4A being cooled by element of pneumatic pressure means contained in hollow H to prevent ridge 4R from flowing into hollow H under welding temperature.

The step by step process of fabricating or manufacturing a tank using instant means and method of assembly for welding together component elements of a tank comprising preformed sectional portions placed edge to edge with preformed welding strip means disposed therebetween into a homogeneous whole involves following procedure:

(1) The lower sectional portion 2 is first inserted into lower sectional jig portion 1 as illustrated by FIG. 1.

(2) Median ridge means 4R of continuous preformed strip means 4 is then placed resting on edge 3 of sectional tank portion 2 with face of lowermost flange portion 4F bordering lower side of median ridge 4R being firmly pressed against inside surface of lower jig means portion 2 adjoining edge 3.

(3) The inside edge 3A of upper sectional portion 2A is then placed in position surrounding uppermost flange portion 4F of strip 4 and snugly bordering upper side of ridge 4R resting on abutting edge 3 of sectional tank portion 2.

(4) Upper jig portion 1 is then placed over sectional portion 2A, firmly secured and clamped in assembled position by bolts 1B—1B thru respective jig flanges 1F—1F.

(5) Pneumatic pressure means effective against inner surface of base means 4B of strip 4 is then admitted into hollow of tank sectional portions 2–2A via valve means 5, flange means 4F—4F being expanded outwardly and impinged against proximate inside surfaces of sectional tank portions 2 and 2A to hold same in position for welding.

(6) Heating element 6 is then activated to a welding temperature over a predetermined time necessary to fuse, and compatible with the indigenous nature of material to be bond-welded together; pneumatic pressure effective against inner surface of strip base means 4B to hold strip 4, flange surfaces 4F—4F concomitant edges 3–3A in opposition when softened by fusing temperature, the pneumatic pressure means further acting to cool the welded area.

(7) A cooling period for the work being predetermined according to nature of welded material, is allowed to elapse, and finished product is then removed.

Special notice: The heating element 6 for most dependable results should be sufficiently narrower than base 4B and flange means 4F—4F to localize and confine application of heat to an area narrower than strip base 4B and restrict flow of molten material closely adjacent abutting edges 3–3A and outer terminus of ridge 4R of strip 4 or 4A. Any element used for pneumatic pressure means may be utilized as a coolant effective against base 4B to harden and thereby support molten or semi-molten material against flowing away from the fuse point as at 2–2A, 3–3A, 4F—4F, and 4R—4R, until the work is cooled for removal from jig means 1–1A.

It is recommended that material fusing at a higher temperature be used for the base 4C of welding strip 4A as of FIG. 2, than that used for ridge portion 4R and flanges faces 4F—4F, thereby confining flow of fusing material over a larger area inside of sectional tank portions 2 and 2A than would be possible if entire welding strip were made of the same material.

Having described the invention, the following claims are made:

1. A tank welding process of the character described including a step by step method of telescopically bringing together and holding in assembled relationship, tank component means comprising hollow means having closed and open ends with edges of said open ends conjoining concomitant and surrounding annular welding strip means telescoped into wedged contact impinging proximate inner walls of said hollow means, establishing a hollow pressure tight tank assembly, establishing means of introducing and maintaining pneumatic pressure means within the hollow of the tank assembly, preparatory to welding, establishing heating means surrounding the outside of the conjoining said welding strip means and thereby establishing the area of weld, welding heat being applied over the area of weld, establishing embracing means concomitant clamping means enveloping said assembly, establishing the means of holding said tank component means together under effects of internal pressure.

2. A step by step process of welding tank component means together as defined by claim 1, wherein the step of introducing pneumatic pressure into the hollow of the tank assembly establishes pressure means effective against the inner face of, to cool and urge the borders of the welding strip against proximate inside wall portions of the hollow means effective to contain molten material between the cooled area of said welding strip and the heating means established concomitant the embracing and clamping means, that portion of said embracing and clamping means bordering said heating means being exposed to atmosphere establishing cooling means preventing flow and flash of molten material away from the external area of the weld establishing means eliminating the build-up of flash inside and outside of said area of weld, thereby imparting a smooth exterior wall finish over the area of weld.

3. A tank welding process of the character described comprising successive steps of assembling tank component means together forming a tank assembly with a pressure tight hollow, by telescoping the opposite edges forming the outer periphery of an annular welding strip means into opposed concavities of the hollow means having domed closed ends with open ends terminating in edges impinging the annular welding strip means, and arranged in a manner to accurately space the impinging edges apart to permit flow of molten material therebetween, establishing embracing means enveloping said tank component means, establishing clamping means bringing and holding said component means in assembled relationship, establishing heating means concomitant said clamping means and bordered by said embracing means, the outside of said embracing and clamping means being exposed to atmosphere establishing cooling means for the outside of the tank assembly after being welded, establishing means limiting radiation of heat away from area of weld during the welding process.

4. A tank welding process of the character described comprising the steps of telescopically assembling the tank component means together in wedged, pressure tight relationship, establishing pneumatic pressure within the tank prior to welding, establishing welding heat applied to the exterior area of the weld, establishing cooling means concomitant with embracing means and clamping means bordering the area of the weld outside of the tank wall, establishing means to contain molten material in the zone of weld thereby establishing means to prevent flow and flash of molten material from the zone of the weld and establishing means for cooling the finished work prior to removal from the embracing and clamping means.

References Cited by the Examiner
UNITED STATES PATENTS

| | | | |
|---|---|---|---|
| 537,013 | 4/1895 | Burton et al. | 219—159 |
| 1,435,996 | 11/1922 | Taylor | 219—100 |
| 1,483,293 | 2/1924 | Foster et al. | 219—137 |
| 1,572,740 | 2/1926 | Mattice | 219—67 |
| 1,630,037 | 5/1927 | Stresau | 219—137 |
| 2,649,527 | 8/1953 | Chapman et al. | 219—9.5 |

RICHARD M. WOOD, *Primary Examiner.*